United States Patent

Kaveloski

[11] 3,959,914
[45] June 1, 1976

[54] PREFABRICATED DISPOSABLE FLY TRAP

[76] Inventor: Robert J. Kaveloski, 39663 Balboa Drive, Sterling Heights, Mich. 48078

[22] Filed: May 23, 1975

[21] Appl. No.: 580,481

[52] U.S. Cl. .................................. 43/118; 43/107
[51] Int. Cl.² ........................................ A01M 1/10
[58] Field of Search ............................. 43/118, 107

[56] References Cited
UNITED STATES PATENTS

| | | | |
|---|---|---|---|
| 985,840 | 3/1911 | Rockley | 43/118 |
| 1,277,527 | 9/1918 | Allen | 43/118 |
| 1,606,568 | 11/1926 | Gross | 43/107 |
| 3,581,429 | 6/1971 | Hickman et al. | 43/107 |

*Primary Examiner*—Hugh R. Chamblee
*Assistant Examiner*—Daniel J. Leach
*Attorney, Agent, or Firm*—Willis Bugbee

[57] ABSTRACT

A prefabricated T-shaped blank of flexible sheet material with a pair of screened openings spaced apart from one another in the longitudinal portion of the blank is foldable along spaced parallel fold lines into a fly trap structure composed of outer and inner arch-shaped walls with screened skylights therein, the inner screened skylight having a small exit port therein. The structure thus formed has a floor panel with approximately arch-shaped side wings foldable upward therefrom into end closures for the structure, these wings containing small entrance doors near their fold edges.

10 Claims, 6 Drawing Figures

}

U.S. Patent  June 1, 1976  3,959,914
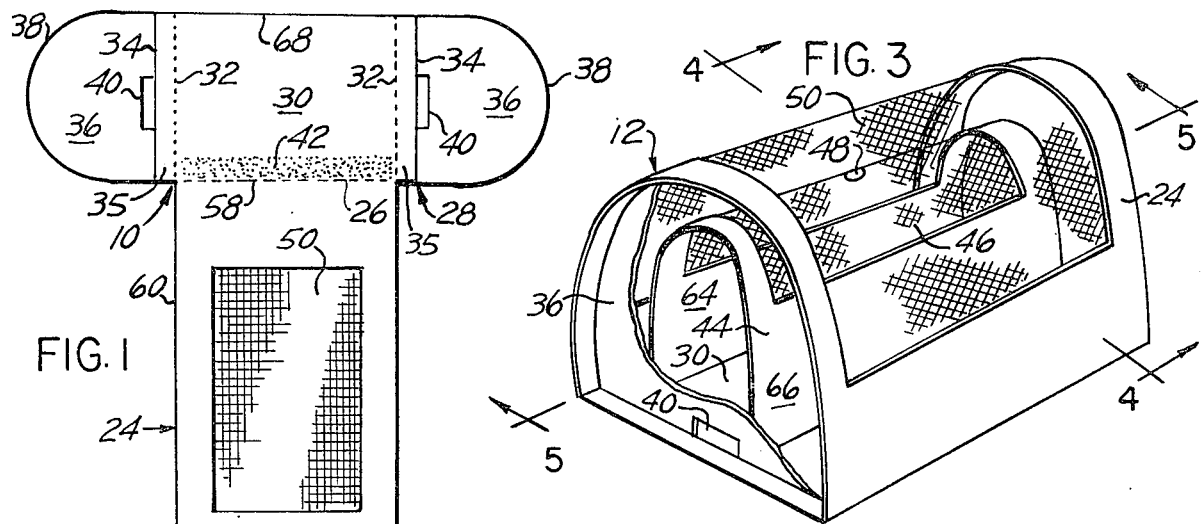
FIG. 1
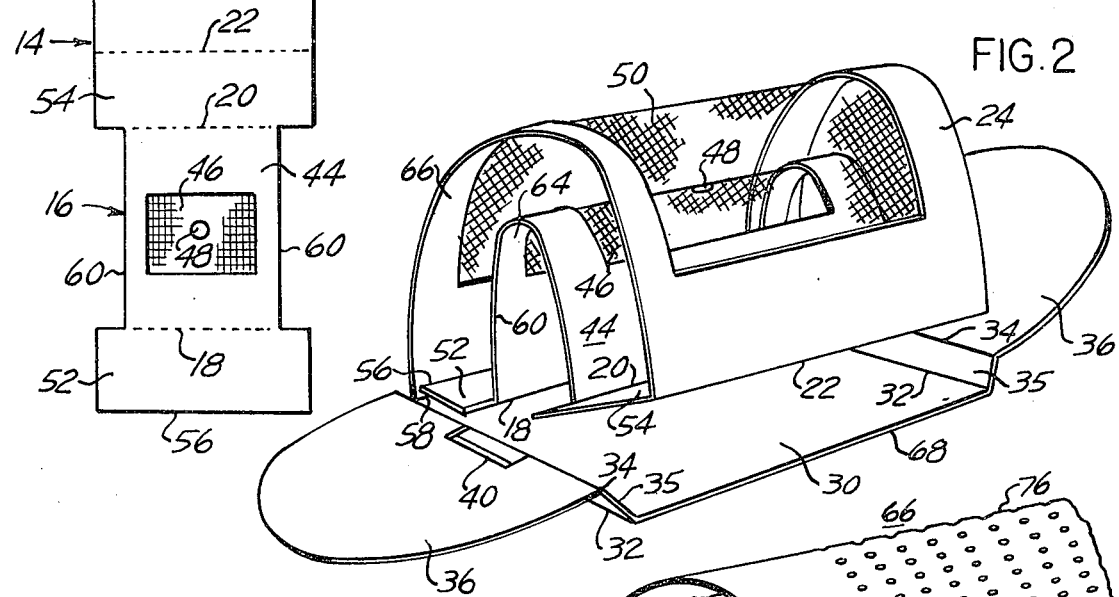
FIG. 3
FIG. 2
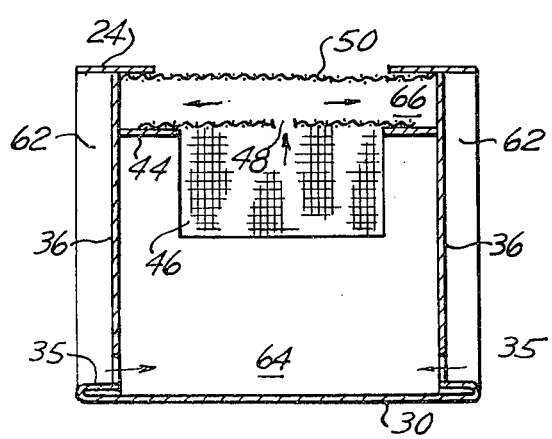
FIG. 5
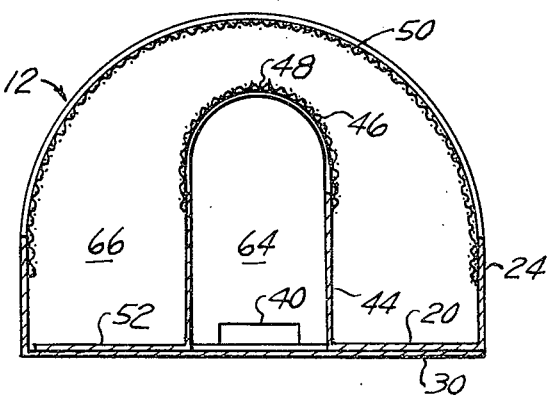
FIG. 6
FIG. 4

PREFABRICATED DISPOSABLE FLY TRAP

BACKGROUND OF THE INVENTION

Hitherto, fly traps have been reused repeatedly, so that, even though they are emptied of the dead flies therein, they nevertheless usually contain eggs or maggots which subsequently hatch out, so that the repeatedlyreused trap remains contaminated. Moreover, often a week elapses between successive garbage collections, during which period more maggots or eggs contained in the discarded contents of the trap hatch into more flies which excape to breed again.

SUMMARY OF THE INVENTION

This prefabricated blank is quickly and easily folded into a disposable fly trp which, when filled with flies, is immediately destroyed along with its contents or placed in the garbage or trash can for collection, and is never emptied or reused. It is normally and initially in the form of a prefabricated flat sheet blank which is easily packed, shipped and stored, yet is quickly and easily folded into a complete fly trap ready for use. Enticed by a suitable bait, the fly enters one of the small end doors in one of the end walls and finds himself in an arch-shaped inner compartment with a screened skylight at its top containing a small exit port. The existing darkness in the lower portion of this inner compartment contrasts with the lighted lower and upper skylights, the light from which lures the fly upward through the exit port into the outer chamber between the outer and inner arch-shaped walls. Since the only exit from this outer chamber is back through the small inner skylight port, the fly is unlikely to find it and consequently becomes trapped in this outer chamber.

In the drawing,

FIG. 1 is a top plan view of a pre-fabricated flat blank which is foldable into a disposable fly trap, according to one form of the invention;

FIG. 2 is a perspective view of the prefabricated blank of FIG. 1 at an intermediate stage partly folded into the disposable fly trap shown in FIG. 3;

FIG. 3 is a perspective view, similar to FIG. 2, but with the prefabricated blank completely folded into its final form of disposable fly trap, with one of the end walls broken away to disclose the inner and outer side walls and screened skylights forming inner and outer compartments and parts behind it;

FIG. 4 is a vertical cross-section, taken along the line 4—4 in FIG. 3;

FIG. 5 is a vertical longitudinal section, taken along the line5—5 in FIG. 3; and FIG. 6 is a fragmentary top plan view of a portion of a modified skylight.

Referring to the drawing in detail, FIG. 1 shows a prefabricated disposable fly trap blank, generally designated 10, which is subsequently folded, as shown in FIG. 2, into the double-walled, double-compartmented disposable fly trap with screened inner and outer skylights, as shown in FIG. 3. The blank 10 is an approximately T-shaped sheet of stiff but flexible sheet material with an elongated longitudinal portion 14 subdivided into an approximately I-shaped lower end portion or panel 16 with parallel inner fold lines 18 and 20 and an upper fold line 22 which divides the I-shaped longitudinal end panel from a rectangular longitudinal intermediate panel 24. The latter terminates in an upper fold line 26 separating it from a transverse end panel 28. The transverse end panel 28 which approximately resembles the cross bar of a T has a central rectangular base or floor panel 30 separated at its opposite ends by two fold lines 32 and 34 defining therebetween spacing strips 35 separating the floor panel 30 from a pair of approximately arch-shaped end wings 36 with arcuate edges 38. Each of the end wings 36 adjacent its fold line 34 has a small entrance doorway 40. The central rectangular portion 30 adjacent the fold line 26 preferably is provided with an adhesive layer 42 of elongated rectangular shape.

The shorter central part or panel 44 of the approximately I-shaped lower portion 16 subsequently forms the inner side wall of the fly trap 12 and is provided with a small rectangular screened opening 46 containing a tiny central aperture 48 and subsequently forming an inner lower skylight 46, whereas the larger rectangular portion 24 contains a longer and wider rectangular screened opening 50 subsequently forming an outer upper skylight 50. Wire mesh, plastic mesh or textile mesh screening is suitable for covering the openings 46 and 50. The I-shaped lower portion 16 is composed of a central panel 44, a bridge portion or strip 54 connected at the fold lines 20 and 22 to the panel 24, and an attachment strip or tab 52 connected to the central panel 44 at the fold line 18.

The folding and assembling of the prefabricated blank 10 of FIG. 1 into the completed disposable fly trap 12 of FIG. 3 takes place in the manner shown at an intermediate stage in FIG. 2. In so doing, the operator first folds upward from the plane of the flat prefabricated blank 10 of FIG. 1 the outer rectangular attachment strip or tab 52 of the I-shaped part 16 along the fold line 18. He then folds the rectangular portion 44 into upwardly-bowed arcuate form along the fold line 20, after which he folds the inner rectangular bridge portion 54 along the fold lines 20 and 22 so that the portions 44 and 24 are temporarily approximately perpendicular to the bridge portion 54.

With the prefabricated blank 10 thus preliminarily folded, he then pulls the panels 44 and 24 into approximately concentric arch-shaped form, as shown in FIG. 2, at the same time folding the panel 24 relatively to the floor panel 30 along the fold line 26. He then pushes the outer edge 56 of the attachment strip or tab 52 against the fold line 26 and secures it to the floor panel 30 by pressing it downward against the adhesive area 42. The relative positions of the component parts of the fly trap 12 now occupy the approximate positions shown in FIG. 2.

To complete the assembly of the fly trap 12 from the intermediate position of FIG. 2 to the final position of FIG. 3, the operator now swings the rectangular portion 54 downward against the edge 68 opposite the fold line 26 and staples or adhesively secures the portions 52 and 54 against the rectangular floor portion or panel 30 adajcent the opposite edges 58 and 68 thereof.

The fly trap is then baited by placing meat, garbage or other flyattracting material on the floor panel 30 in the inner compartment 64 formed by the inner portion 44. The operator now completes the assembly by folding the end wings 36 upward around their respective fold lines 32 and 34 into detent engagement with the end edges 60 of the panel 44, thereby forming small vestibules 62 at the opposite ends of the completed fly trap 12 shown in FIG. 3.

In use, the flies, attracted by the bait inside the trap 12, enter through the small end doorways 40 into the inner compartment or chamber 64, whence they are attracted upward by the light streaming downward through the screened skylights 46 and 50, eventually making their way to and through the tiny exit port 48, whence they arrive in the outer chamber 66, lighted by the screened upper skylight 50. Here they are trapped, because the only way out of the outer compartment 66 is backward through the tiny exit port 48 into the inner compartment 64 and thence outward through one of the small end doors 40--a route which practical experience with this fly trap 12 has proved that the fly is almost entirely unable or unwilling to follow, especially when it means going from a brightly lighted space into a dark space in order to reach one of the small end doors 40.

When a sufficient number of flies have been thus entrapped, the user disposes of the entire trap by placing it in a garbage can or trash can or bag. He then replaces it with another disposable fly trap 12, whereupon the foregoing procedure and operation are repeated.

In the modified wall 70 of FIG. 6, which may be either the inner or outer arch-shaped wall but is shown as the inner wall, the wall 70 is provided with a cluster 72 containing a multiplicity of tiny openings 74, such as perforations or slots disposed in close proximity to one another. These openings 74 are individually too small or too narrow for the passage of an average house fly, but in their totality they transmit enough light collectively to lure such flies upward through the fly exit port 76 from the inner chamber 64 to the outer chamber 66.

I claim:

1. A prefabricated blank adapted to be folded into a disposable fly trap, said blank comprising
   - an elongated approximately T-shaped member of flexible sheet material including
     - a longitudinal end panel adapted to be folded at a first predetermined fold location into an arch-shaped inner wall of the fly trap and thereby to define an inner fly trap chamber,
     - a bridge portion disposed adjacent said longitudinal end panel and adapted to be folded relatively thereto at a second predetermined fold location,
     - a longitudinal intermediate panel disposed adjacent said bridge portion and adapted to be folded relatively thereto at a third predetermined fold location into an arch-shaped outer wall of the fly trap disposed in outwardly-spaced relationship to the arch-shaped inner wall thereof and to define therebetween an outer fly trap chamber,
     - each of said panels having therein a light-transmitting area and a fly restrainer,
     - said longitudinal end panel having a fly exit port therein adapted in the arch-shaped folded positions of said panels to lead from the inner chamber to the outer chamber,
   - and a transverse end panel disposed adjacent said longitudinal intermediate panel and adapted to be folded relatively thereto at a fourth predetermined fold location into a floor wall of the fly trap,
     - said transverse end panel having at its opposite ends arch-shaped wings adapted to be folded upward into end-closing relationship with the opposite ends of the inner and outer arch-shaped walls,
     - one of said wings having a fly entrance doorway therein adapted in the folded condition of the blank to lead from the exterior of the trap into the outer chamber thereof.

2. A pre-fabricated disposable fly trap blank, according to claim 1, wherein said longitudinal end panel has an attachment strip connected thereto on the opposite side thereof from said bridge portion, and is adapted to be folded at a fifth predetermined fold line into a position substantially perpendicular to the adjacent portion of said longitudinal end panel.

3. A pre-fabricated disposable fly trap blank, according to claim 1, wherein said longitudinal end panel is narrower than said longitudinal intermediate panel and in its arch-shaped folded position has its edges disposed inward from the corresponding edges of the longitudinal intermediate panel whereby to provide a vestibule at opposite ends of the folded fly trap.

4. A pre-fabricated disposable fly trap blank, according to claim 3, wherein said transverse end panel between said wings and the adjacent ends of said transverse end panel is provided with spacing strips adapted to be folded relatively to said wings and to said transverse end panel whereby to inset said wings into the vestibule while closing the opposite ends of the arch-shaped outer and inner walls.

5. A pre-fabricated disposable fly trap blank, according to claim 1, wherein said light-transmitting area comprises an opening and wherein said fly restrainer comprises a network screen disposed in said opening.

6. A pre-fabricated disposable fly trap blank, according to claim 2, wherein said transverse end panel is provided with an adhesive layer thereon disposed in a path of engagement with said attachment strip for securing said attachment strip to said transverse end panel in the folded positions thereof.

7. A fly trap, comprising
   - a floor panel of sheet material,
   - an outer arch-shaped wall secured to said floor panel and having an outer fly-restraining skylight in the upper portion thereof,
   - an inner arch-shaped wall secured to said floor panel in inwardly-spaced relationship to said outer arch-shaped wall and having an inner flyrestraining skylight in the upper portion thereof,
     - said inner fly-restraining skylight having a fly exit port therein facing said outer fly-restraining skylight,
   - and an arch-shaped end wall disposed at each of the opposite ends of said outer and inner arch-shaped walls in closing relationship therewith,
     - at least one of said end walls having a fly entrance doorway therein.

8. A fly trap, according to claim 7, wherein said inner arch-shaped wall is shorter than said outer arch-shaped wall, and wherein at least one of said end walls is inset relatively to said outer arch-shaped wall whereby to provide a vestibule in said trap.

9. A fly trap, according to claim 7, wherein at least one of said fly-restraining skylights comprises an opening in the upper portions of said outer and inner arch-shaped walls and also comprises a network screen disposed across said opening in closing relationship therewith.

10. A fly trap, according to claim 7, wherein at least one of said fly-restraining skylights comprises multiple perforations disposed in closely-spaced relationship in the upper portions of said outer and inner arch-shaped walls, each of said perforations being sufficiently small to bar the passage of flies therethrough.

* * * * *